US010223848B2

(12) United States Patent
Browning et al.

(10) Patent No.: US 10,223,848 B2
(45) Date of Patent: Mar. 5, 2019

(54) INTERNET OF THINGS SMART ENTRY

(71) Applicant: Intel Corporation, Santa Clara, CA (US)

(72) Inventors: David W. Browning, Beaverton, OR (US); Mark MacDonald, Beaverton, OR (US); Yoshifumi Nishi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 15/269,585

(22) Filed: Sep. 19, 2016

(65) Prior Publication Data

US 2018/0082502 A1 Mar. 22, 2018

(51) Int. Cl.
| | |
|---|---|
| *G07C 9/00* | (2006.01) |
| *H04L 29/08* | (2006.01) |
| *H04W 88/08* | (2009.01) |
| *H04W 88/02* | (2009.01) |
| *H04W 76/10* | (2018.01) |
| *H04W 4/80* | (2018.01) |
| *H04W 4/70* | (2018.01) |

(52) U.S. Cl.
CPC ..... *G07C 9/00007* (2013.01); *G07C 9/00031* (2013.01); *G07C 9/00309* (2013.01); *H04L 67/02* (2013.01); *H04L 67/12* (2013.01); *H04L 67/26* (2013.01); *H04L 67/306* (2013.01); *G07C 9/00087* (2013.01); *G07C 2009/00769* (2013.01); *H04W 4/70* (2018.02); *H04W 4/80* (2018.02); *H04W 76/10* (2018.02); *H04W 88/02* (2013.01); *H04W 88/08* (2013.01)

(58) Field of Classification Search
CPC ............ G07C 9/00007; G07C 9/00309; G07C 2009/00769; H04W 4/008; H04W 88/08; G06K 9/00348
See application file for complete search history.

(56) References Cited

U.S. PATENT DOCUMENTS

| | | | |
|---|---|---|---|
| 7,880,613 B1 | 2/2011 | Maeng | |
| 7,917,768 B2 * | 3/2011 | Kahn | ................. G06K 9/00348 713/156 |
| 9,262,879 B2 | 2/2016 | Ahearn et al. | |

(Continued)

FOREIGN PATENT DOCUMENTS

WO 2013179634 12/2013

OTHER PUBLICATIONS

"How To: Turn Your Lights Off On a Schedule", SmartThings, [Online]. Retrieved from the Internet: URL: https://blog.smartthings.com/how-to/turn-lights-schedule/, (Mar. 25, 2015), 4 pgs.

(Continued)

*Primary Examiner* — Thomas D Alunkal
(74) *Attorney, Agent, or Firm* — Schwegman Lundberg & Woessner, P.A.

(57) ABSTRACT

Various systems and methods for providing a smart entry system are described herein. A smart entry system includes a detector to detect a person near a portal to a room; a transceiver to attempt to establish a wireless connection between the smart entry system and a user device associated with the person; and a user interface to present a notification to the person based on a state of the wireless connection.

24 Claims, 6 Drawing Sheets

(56) References Cited

U.S. PATENT DOCUMENTS

| | | | |
|---|---|---|---|
| 2006/0187034 A1* | 8/2006 | Styers | G05B 9/02 340/545.1 |
| 2006/0195050 A1* | 8/2006 | Alwan | A61B 5/1038 600/595 |
| 2013/0162430 A1* | 6/2013 | Scherzer | H04W 52/0261 340/539.13 |
| 2014/0267740 A1* | 9/2014 | Almomani | G07C 9/00182 348/156 |
| 2015/0347114 A1 | 12/2015 | Yoon | |
| 2016/0042582 A1* | 2/2016 | Hyde | G07C 9/00944 70/53 |
| 2016/0134609 A1* | 5/2016 | Durham | H04L 63/08 726/7 |
| 2017/0149517 A1* | 5/2017 | Xie | G06K 9/00288 |

OTHER PUBLICATIONS

Jeong, Jeong-Ile, "A Study on the IoT Based Smart Door Lock System", Lecture Notes in Electrical Engineering: Information Science and Applications (ICISA), vol. 376, Springer Singapore, (2016), 1307-1318.

Kim, Sung Woo, "Gate reminder: a design case of a smart reminder", Proceedings of the 5th conference on Designing interactive systems: processes, practices, methods, and techniques, (2004), 81-90.

\* cited by examiner

INTERNET OF THINGS SMART ENTRY

TECHNICAL FIELD

Embodiments described herein generally relate to sensor systems and in particular, to an Internet of Things smart entry system.

BACKGROUND

Internet of Things (IoT) is a term that represents a collection of devices and systems that communicate over a network, such as the Internet. The IoT is a network of physical objects or "things" embedded with electronics, software, and sensors that enables these objects to collect and exchange data between themselves and between other computing devices. Example "things" include connected home appliances, sensors in automobiles, biochips, public cameras, wearable devices, and the like.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

IoT may be described as a 'network of networks' where devices utilize underlying communications networks and technologies such as the Internet to communicate, but form their own logical networks of IoT devices (called nodes). As noted above, the prevalence of IoT devices is increasing. IoT devices may contain a variety of sensors (e.g., cameras, microphones, global positioning systems (GPS), telemetry, etc.) for a variety of purposes, such as a camera and microphone on a television set to allow video conferencing. IoT devices include practically anything that is network-capable and remotely-accessible, such as window shades, refrigerators, ceiling lights, landscaping lights, security systems, thermostats, televisions, network accessible storage (NAS), automobiles, health monitors, exercise equipment, industrial equipment, manufacturing equipment, robots, and so on.

Systems and methods described herein provide a smart entry. Every day, millions of people enter and exit their homes through one or more entries. When exiting, individuals may forget to take with them a user device (e.g., a smartphone, a smartwatch, etc.). When entering the home, individuals may need a prompt or other information about a user device that is contextually relevant now that the individual has returned home. What is needed is an intelligent system to manage the user's devices.

Figure 1:
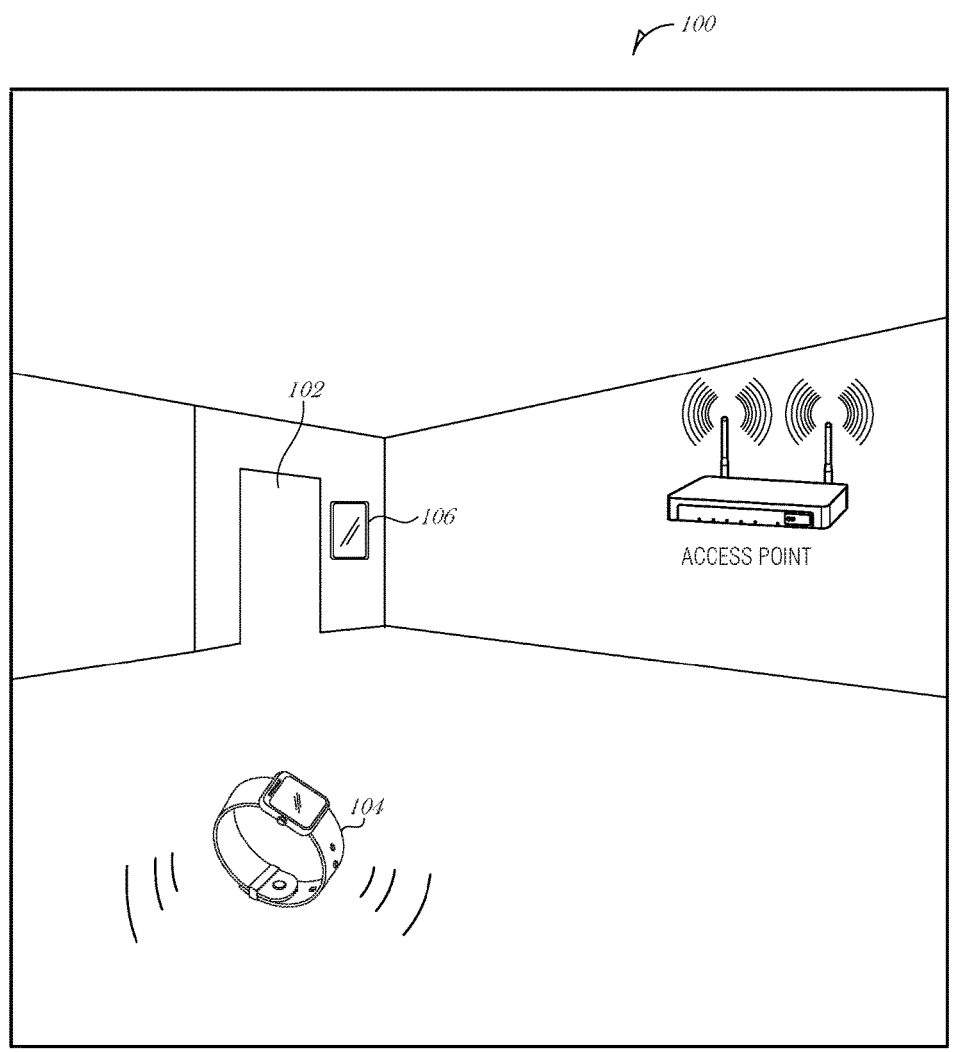
FIG. 1 is a schematic drawing illustrating an operating environment, according to an embodiment.

FIG. 1 is a schematic drawing illustrating an operating environment 100, according to an embodiment. The operating environment includes a portal 102, through which a person may enter or exit the operating environment 100. The operating environment 100 may be any type of building or controlled area including, but not limited to a residence, a home, an apartment, an office suite, a school, or the like. Although only one portal 102 is illustrated in FIG. 1, it is understood that the systems and operations described herein may be used on multiple portal that are available to enter or exit an operating environment 100. The portal 102 may include a door or other mechanism to control entry, such as a revolving door, a swinging door, a sliding door, and the like. Optionally, the portal 102 need not include an actual door, but may be any passageway through a wall, such as an archway, hallway, or the like. The portal 102 allows for people to enter or exit the operating environment 100 and acts as a controlled point of entry.

When a person approaches the portal 102 a smart entry system 106 may detect the approach. When the door is opened or the portal 102 is traversed, the smart entry system 106 may determine the state of a user device 104 and provide a notification to the person based on the state of the user device 104. The user device 104 may be any portable computing device, including but not limited to a smartwatch, a smartphone, a personal digital assistant, a laptop, a tablet, a wearable device, smartglasses, or the like.

Sensing devices may be installed on or around the portal 102. The sensing devices may be coupled to the smart entry system 106. Sensing devices may include an infrared sensor, a vibration sensor, a camera, a proximity sensor, a door sensor, or the like. For instance, a vibration sensor may be used to detect the footsteps of a person approaching the portal 102 from either the interior (inside the operating environment 102) or from the exterior (outside of the operating environment 102). Vibrations indicating footsteps of a person may be distinguishable from other vibrations, such as vibrations due to footsteps of a pet, vibrations from appliances, or other sources of vibration. As another example, an infrared proximity sensor may detect motion near the portal 102, indicating a person moving near or through the portal 102. Multiple sensors may be used in combination to detect a person approaching or passing through the portal 102.

When a person is approaching or passes through the portal 102, various processes may be executed. In an example, when the door is opened, the smart entry system 106 may attempt to connect to the user device 104. They may be performed using a Bluetooth link, a WiFi beacon, or other communication mechanism. If the smart entry system 106 cannot detect the user device 104 in proximity to the portal 102, the smart entry system 106 may alert the person that the user device 104 is not present. This may act as a reminder to the person who may have forgotten to take the user device 104 on the way out of the operating environment 100, for example. The notification may be audible or visual, or combinations of audio and visual.

If the smart entry system 106 is able to connect to the user device 104, then the user device 104 may perform various checks, such as a battery check. If the remaining battery is less than a threshold, the user device 104 or the smart entry system 106 may notify the person. For example, if the person is leaving for the day and does not have a charger, it may be useful to be notified that less than 50% of the battery charge is available. While more than a critically low level of battery charge (e.g., 5% remaining), having less than 50% may not allow the user to get through the full day. The notification provided by the system described herein provides the person the opportunity to grab a charger or place the user device 104 on a charging station for a few minutes to get up to 80% battery charge, etc.

The sensing devices may be configured to recognize a particular person, such that the user device check and notifications are performed for people who have associated devices, and not for those who do not have associated devices. For example, when guests visit, as they approach the portal 102, the guest should not be presented any notifications. If the guest registers their device with the smart entry system 106, then the guest may be provided similar notifications as that of the regular occupant of the operating environment 100. The guest may have to perform an initialization of the smart entry system 106, such as by walking away from and back to the portal 102 while the smart entry system 106 is in a learning mode. This activity is used to train the smart entry system 106 to recognize the guest's walking pattern for later use.

Interconnection between IoT devices (e.g., between the smart entry system 106 and the user device 104) may be provided using a variety of communication standards, such as ZigBee, Bluetooth, Bluetooth Low Energy (BLE), Symphony, 6LoWPAN, Wireless Fidelity (WiFi) protocols utilizing an Institute for Electrical and Electronics Engineers (IEEE) 802.11 family of standards, including 802.11n, 802.11ac, 802.11ad, 802.11ah, and the like.

Figure 2:
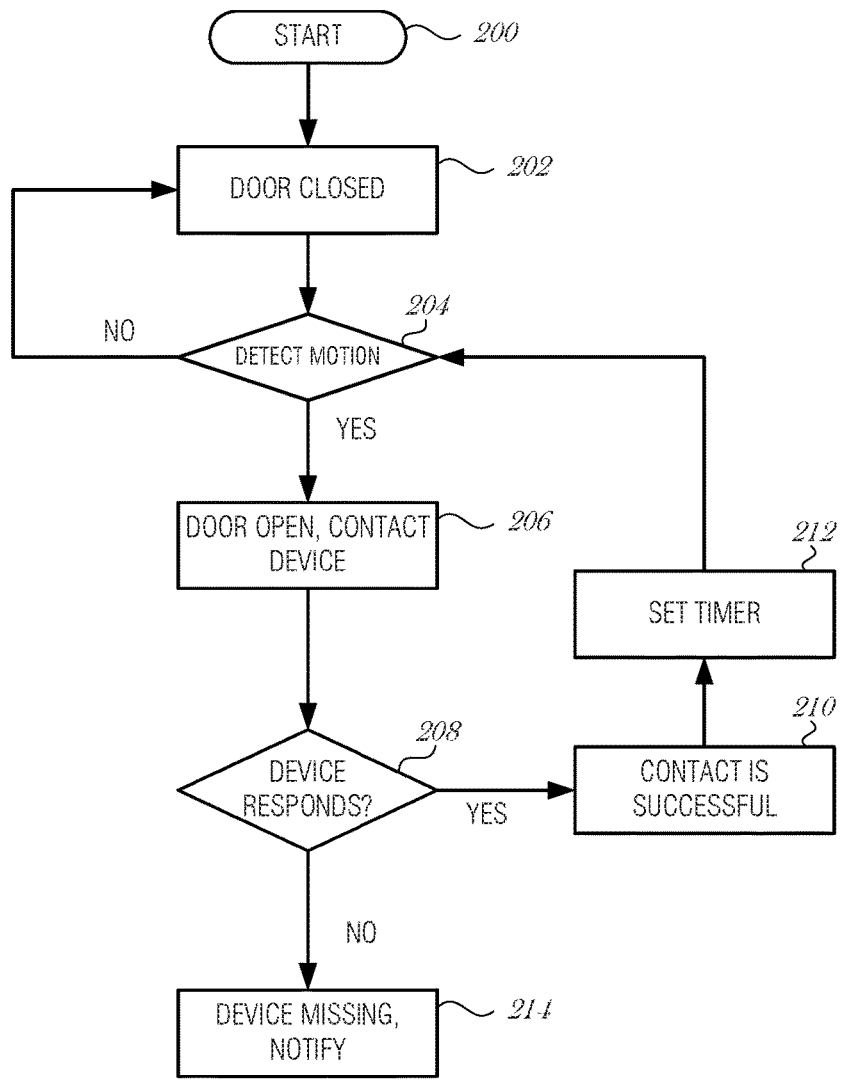
FIG. 2 is a flowchart illustrating the data and control flow, according to an embodiment.

FIG. 2 is a flowchart illustrating the data and control flow, according to an embodiment. At 200, the process starts. The process begins in a "door closed" state 202, where the door is sensed to be in a closed position. If door motion is detected (decision operation 204), then another sensor reading is used to determine whether the door is opened (state 206). The sensors used to determine door position and state may be various types of sensors including, but not limited to an accelerometer, infrared motion detector, vibration sensor, magnetic sensor, or the like.

When the door is detected as being open, the user device is pinged. If the user device responds (decision operation 208), the user device contact is deemed successful (operation 210), and a timer is set to allow the door the close and reset the process (operation 212).

After the user device is contacted, various processes may be executed on the user device. For example, the user device may check its battery state and inform the user of a low battery condition. As another example, the user device may check and confirm that auxiliary devices are also in range (e.g., short range indicating that they are also on or with the person). This may be useful when a user has both a smartphone and a smartwatch, which pairs with and is used primarily with the smartphone. If the smartphone is detected by the smart entry system 106, it may be pinged, initiating a check by the smartphone to determine whether the smartwatch is also being carried/worn by the user.

For proximity checks, a short-range beacon or signal may be used. Additionally, a low-power signal may be used to attenuate the signal and limit its effective range. Mechanisms may implement relative signal strength indicators (RSSI), wireless trilateration, or mesh networking.

If the user device is not detected, then at operation 214, a warning or other notification may be provided by the smart entry system 106. The notification may indicate that the user device is not in range of the doorway, that the user device is not detected, or other information.

Figure 3:
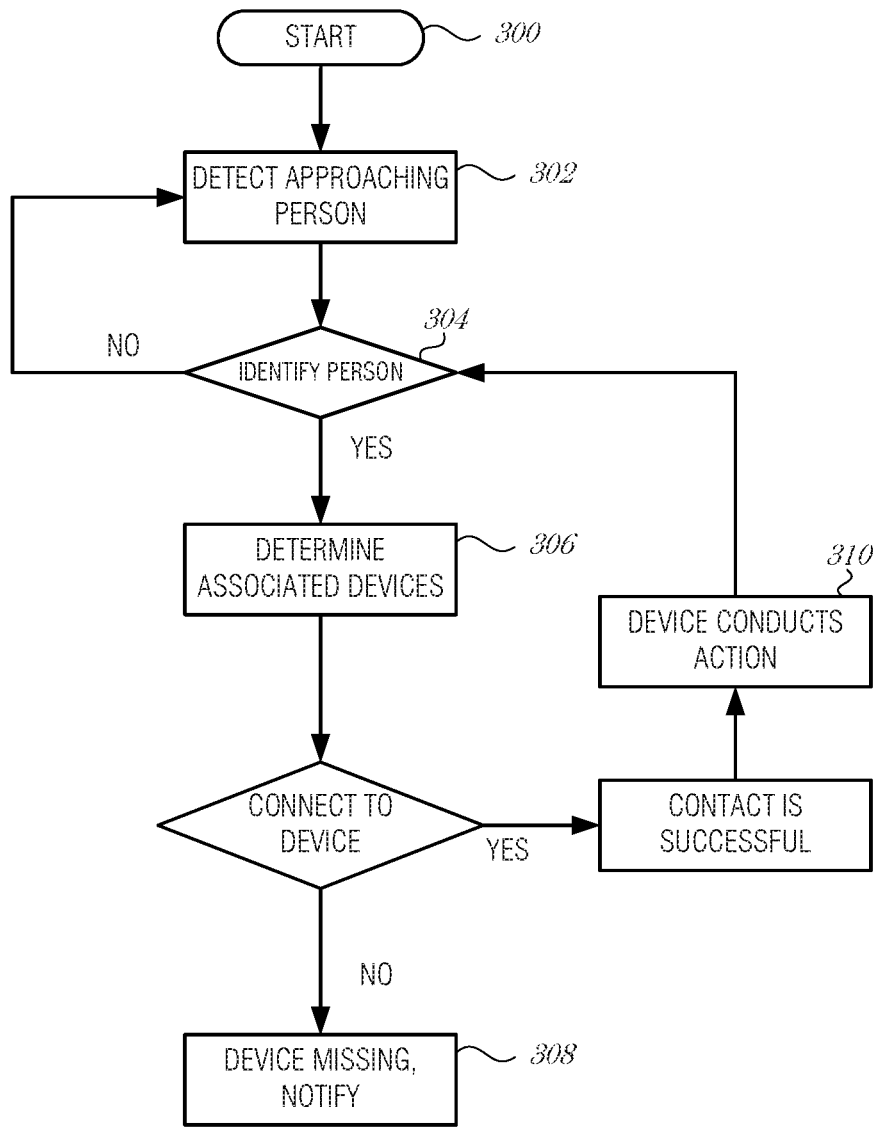
FIG. 3 is a flowchart illustrating the data and control flow, according to an embodiment.

FIG. 3 is a flowchart illustrating the data and control flow, according to an embodiment. At 300, the process starts. The process detects whether a person is approaching the portal (operation 302). The detection may be performed using various sensors, which may be installed in the ceiling, in the floor, on the wall near the portal, or elsewhere. In-floor sensors may sense the vibration of the person's footsteps. A camera array may be mounted in the ceiling or in the wall. An infrared motion detection system may be mounted in the wall or the ceiling. Other sensor combinations and configurations are encompassed in the scope of this disclosure.

At operation 304, the process may attempt to identify the person approaching the portal. For example, using a machine learning algorithm, the footsteps may be classified as a potential profile, indicating a particular person. When cameras used, an image analysis algorithm may perform facial recognition, gait analysis, morphology analysis, or other image classification techniques to identify the person approaching the portal. Other mechanisms may be used to identify the person approaching, such as voice analysis, user device identification (e.g., identify a smartphone used by a particular person), etc.

If the person is recognized, then it is determined whether the person is associated with any user devices (operation 306). If the person is associated with one or more user devices, then the smart entry system 106 attempts to contact at least one of the user devices. The smart entry system 106 may attempt to contact all of the devices associated with the person (operation 308). If the person is not associated with any devices, then no communication is attempted. This may be the case, for example, when a child or a houseguest approaches the portal.

If the smart entry system 106 cannot connect to a user device associated with the presumptive user, as determined by operation 304, then the smart entry system 106 may present a notification (operation 310). The notification may be a visual display, for example, on a display near the portal. The notification may be an audible alert, such as a chime or bell, indicating a warning state and serving as a reminder to the user. The notification may also be a verbal alert, in the language of the user's choice, for example, speaking the notification.

If the notification is in error, the person may provide feedback to the smart entry system 106 to disable the instant notification or disable future notifications. For example, the user may no longer have the smartphone associated with the user. So, in order to avoid false warnings in the future, the user may disable the notifications, delete the user device from the user's profile, or otherwise instruct the smart entry system 106 to ignore the alert state. As another example, the user may have powered down the user device purposefully, and know that the device is in her purse, so the notification is irrelevant. As yet another example, the smart entry system 106 may misidentify the person, in which case, the user may indicate the correct identity. This feedback may be used in a machine learning process to help properly identify the user in future cases.

Similarly, if the user is entering the space controlled by the portal (e.g., entering the house), then the smart entry system 106 may attempt to contact user devices in the user's profile. Similar notifications may be presented if the user's device does not respond. This may indicate that the user forgot their device in the car, at work, or somewhere else.

The user device may provide a responsive action when contacted by the smart entry system 106 (operation 312). Example operations include checking its battery and presenting a notification to the user when the battery level is low. This notification may be presented by the user device or by the smart entry system 106.

Another example operation is to present notifications regarding other events or reminders, interface with home automation devices, etc. As such, notifications may also be based on other data, such as the person's appointment calendar. For instance, the person's calendar data may be retrieved through a network (e.g., via the cloud) or from the person's device. The notification may be a reminder of an upcoming or past due event. As an example, the notification may advise the user to bring a charging cord or a portable charger if a charge is likely going to be needed during the day. As another example, the user may be advised to bring their work badge, work laptop, or other asset if they are heading into the office. As yet another example, the user may be advised to bring their passport if they are heading to the airport.

Figure 4:
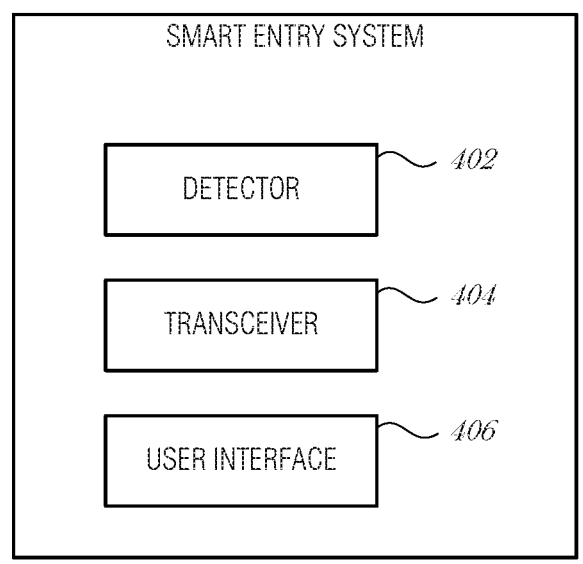
FIG. 4 is a block diagram illustrating a smart entry system, according to an embodiment.

FIG. 4 is a block diagram illustrating a smart entry system 400, according to an embodiment. The smart entry system 400 may include a detector 402, a transceiver 404, and a user interface 406. The detector 402 may include sensors or be coupled to sensors. The detector 402 may operate to decode, filter, or otherwise process sensor data in order to provide a detection mechanism. The transceiver 404 may include a radio, antenna, control processing, or other components to provide wireless communication. The user interface 406 may include or be coupled to a display (e.g., a liquid crystal display), a speaker, a haptic driver, or other component to receive user input or provide output.

The detector 402 may be configured to detect a person near a portal to a room. The portal may include, but is not limited to, a doorway, an entrance, a hallway, an archway, or other entryway in to or out of a space. In an embodiment, to detect the person near the portal, the detector 402 is to receive sensor data from a sensor coupled to the smart entry system 400 and detect the person with the sensor data. The sensor data may be provided by one or more sensors coupled to or incorporated with the detector 402.

In an embodiment, the sensor comprises a vibration sensor. In such an embodiment, to detect the person, the detector 402 is to detect a pattern of footsteps with the vibration sensor indicating human gait.

In another embodiment, the sensor comprises an infrared sensor. The infrared sensor may be used to detect motion, such as motion by the person approaching the portal. The infrared sensor may be positioned to detect motion near the portion, for example, by angling the sensor's field of view oblique to the direction of travel to the portal.

In another embodiment, the sensor comprises a camera. In such an embodiment, to detect the person, the detector 402 is to perform at least one of a facial detection technique on an image acquired by the camera, a human detection technique on the image acquired by the camera, or a motion classification technique on a plurality of images acquired by the camera.

In another embodiment, the sensor comprises a wireless beacon, the wireless beacon configured to sense the user device in proximity to the portal. For example, the user device may be on the person's body (e.g., wearable device such as a smartwatch), or carried by the person, such that when the device passes or approaches the portal, there is an inference that the person is also approaching.

In another embodiment, the sensor comprises a door sensor that activates when the door to the portal is opened. For example, the door sensor may be a pair of electrical contacts that form an electric circuit when the door is closed. One of the pair of electrical contacts may be disposed on the door and another of the pair of electrical contacts may be disposed on the door frame. When the door is opened, the circuit is broken.

The sensor data may be a radio-frequency identification (RFID), such that an RFID card kept in a person's wallet, tagged on a smartphone, or otherwise carried or implanted in a person, is detected as the person approaches the portal. The RFID may include a unique identification identifying the person. To detect the person near the portal, the smart entry system may query nearby RFID tags. Thus, in yet another embodiment, the sensor includes an RFID reader that senses an RFID tag carried by the person. The RFID tag may be attached to a user device, attached to the person's clothing, attached to another personal article, implanted in the person, etc.

The transceiver 404 may be configured to establish a wireless connection between the smart entry system and a user device associated with the person. The transceiver 404 may attempt connection over any of a variety of wireless connection protocols, such as Bluetooth, WiFi, NFC, or the like.

The user interface 406 may be configured to present a notification to the person based on a state of the wireless connection. In an embodiment, the state of the wireless connection is unconnected and in such an embodiment, to present the notification, the user interface 406 is to present a visual alert to the person that the smart entry system was unable to connect to the user device.

In another embodiment, the state of the wireless connection is unconnected and in such an embodiment, to present the notification, the user interface 406 is to present an audible alert to the person that the smart entry system was unable to connect to the user device. The audible alert may be a chime, voice notification, a bell, or the like.

In another embodiment, wherein when attempting to establish the wireless connection between the smart entry system 400 and a user device associated with the person is successful, the user device is to perform an additional operation as a result of the wireless connection.

In a further embodiment, the additional operation comprises checking a battery level and presenting an alert when the battery level is below a threshold. In a further embodiment, the threshold is based on an amount of power used in a day. The threshold may be set based on historical battery usage, for example over a moving window of seven days. The threshold may be user configurable.

In another embodiment, the threshold is based on an estimated amount of power needed for the remainder of a day. For example, if the user leaves their apartment in the afternoon, the threshold may be based on an expected usage window that terminates at 10:00 PM, which may represent a portion of the total use window for a given day (e.g., from 8:00 AM to 10:00 PM). Based on the expected usage window, the daily battery usage may be proportionally reduced (e.g., from 14 hours to 7 hours, or approximately one half of the battery usage of a full day's usage). Thus, if a full battery is able to operate for approximately 20 hours of usage, and a threshold for the amount of power used in a day is approximately 14 hours of that battery charge (70%), then a threshold of 35%, or half that of the expected full day's battery usage, may be used when the user exits the apartment at 3:00 PM.

In an embodiment, the smart entry system 400 includes a user identifier to attempt to identify the person and access a profile database to obtain a set of devices associated with the person when the person is identified, where the user device is a device of the set of devices. In a further embodiment, to attempt to identify the person, the user identifier is to access a pattern of vibrations and identify the person based on the pattern of vibrations.

In another embodiment, to attempt to identify the person, the user identifier is to access an image of the person and perform image analysis to identify the person. In a further embodiment, the image analysis includes a gait analysis of the person's stride. In a related embodiment, the image analysis includes facial analysis of the person's face. In a related embodiment, the image analysis includes morphological analysis of the person's body. Combinations of image analysis techniques may be used together.

In an embodiment, to attempt to identify the person, the user identifier is to access a voice sample of the person and perform voice analysis to identify the person.

In yet another embodiment, to attempt to identify the person, the user identifier is to access a unique identifier encoded in an RFID tag carried by the person that identifies the person.

In an embodiment, the profile database includes a plurality of profiles. The profiles may be for the person and the person's family, for example. In a workplace setting, the profiles may be associated with employees of the workplace. In other environments, the profiles may encompass the people who are in the environment.

In an embodiment, the room is a room in a residence, and the profile database includes a plurality of profiles for a subset of people who reside in the residence.

In an embodiment, when attempting to identify the person fails, the user interface 406 is to prompt the person to perform an initialization process to train the smart entry system on the person. The person may then indicate that the smart entry system 400 incorrectly identified, or failed to identify, a registered user and correct the smart entry system 400. This feedback may be used to refine the identification process. If the person is not a registered user, then the person may perform various actions to initialize the smart entry system 400 with respect to the person, such as providing a voice sample, a gait sample, pairing a device with the smart entry system 400, or the like.

Figure 5:
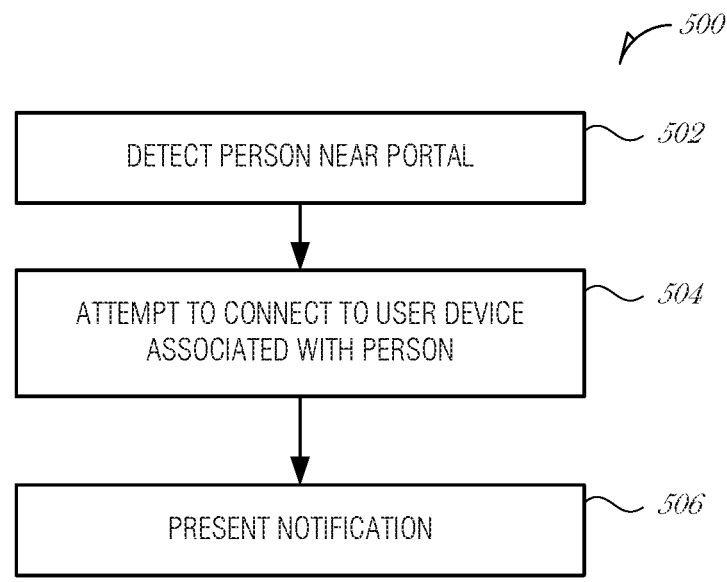
FIG. 5 is a flowchart illustrating a process of providing a smart entry system, according to an embodiment.

FIG. 5 is a flowchart illustrating a process 500 of providing a smart entry system, according to an embodiment. At 502, a person near a portal to a room is detected by the smart entry system. In an embodiment, detecting the person near the portal comprises receiving sensor data from a sensor coupled to the smart entry system and detecting the person with the sensor data. In a further embodiment, the sensor comprises a vibration sensor. In such an embodiment, detecting the person comprises detecting a pattern of footsteps with the vibration sensor indicating human gait. In another embodiment, the sensor comprises an infrared sensor. In another embodiment, the sensor comprises a camera. In such an embodiment, detecting the person comprises performing at least one of a facial detection technique on an image acquired by the camera, a human detection technique on the image acquired by the camera, or a motion classification technique on a plurality of images acquired by the camera. In another embodiment, the sensor comprises a wireless beacon, the wireless beacon configured to sense the user device in proximity to the portal. In another embodiment, the sensor comprises a door sensor that activates when the door to the portal is opened.

The sensor data may be a radio-frequency identification (RFID), such that an RFID card kept in a person's wallet, tagged on a smartphone, or otherwise carried or implanted in a person, is detected as the person approaches the portal. The RFID may include a unique identification identifying the person. Thus, to detect the person near the portal, the smart entry system may query nearby RFID tags.

At 504, the smart entry system attempts to establish a wireless connection with a user device associated with the person.

At 506, the smart entry system presents a notification to the person based on a state of the wireless connection.

In an embodiment, the state of the wireless connection is unconnected and presenting the notification comprises presenting a visual alert to the person that the smart entry system was unable to connect to the user device.

In another embodiment, the state of the wireless connection is unconnected and presenting the notification comprises presenting an audible alert to the person that the smart entry system was unable to connect to the user device.

In another embodiment, when attempting to establish the wireless connection between the smart entry system and a user device associated with the person is successful, the user device performs an additional operation as a result of the wireless connection. In a further embodiment, the additional operation comprises checking a battery level and presenting an alert when the battery level is below a threshold. In a related embodiment, the threshold is based on an amount of power used in a day. In another embodiment, the threshold is based on an estimated amount of power needed for the remainder of a day.

In an embodiment, the method 500 includes attempting to identify the person and accessing a profile database to obtain a set of devices associated with the person when the person is identified, where the user device is a device of the set of devices. In an embodiment, attempting to identify the person comprises accessing a pattern of vibrations and identifying the person based on the pattern of vibrations. In another embodiment, attempting to identify the person comprises accessing an image of the person and performing image analysis to identify the person. In a related embodiment, the image analysis includes a gait analysis of the person's stride. In another embodiment, the image analysis includes facial analysis of the person's face. In another embodiment, the image analysis includes morphological analysis of the person's body.

In another embodiment, attempting to identify the person comprises accessing a voice sample of the person and performing voice analysis to identify the person. In yet another embodiment, attempting to identify the person comprises detecting an RFID tag carried by the person and obtaining a unique identifier from the RFID tag that identifies the person.

In an embodiment, the profile database includes a plurality of profiles. In a related embodiment, the room is a room in a residence, and the profile database includes a plurality of profiles for a subset of people who reside in the residence.

In an embodiment, when attempting to identify the person fails, the method further comprises prompting the person to perform an initialization process to train the smart entry system on the person.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 6:
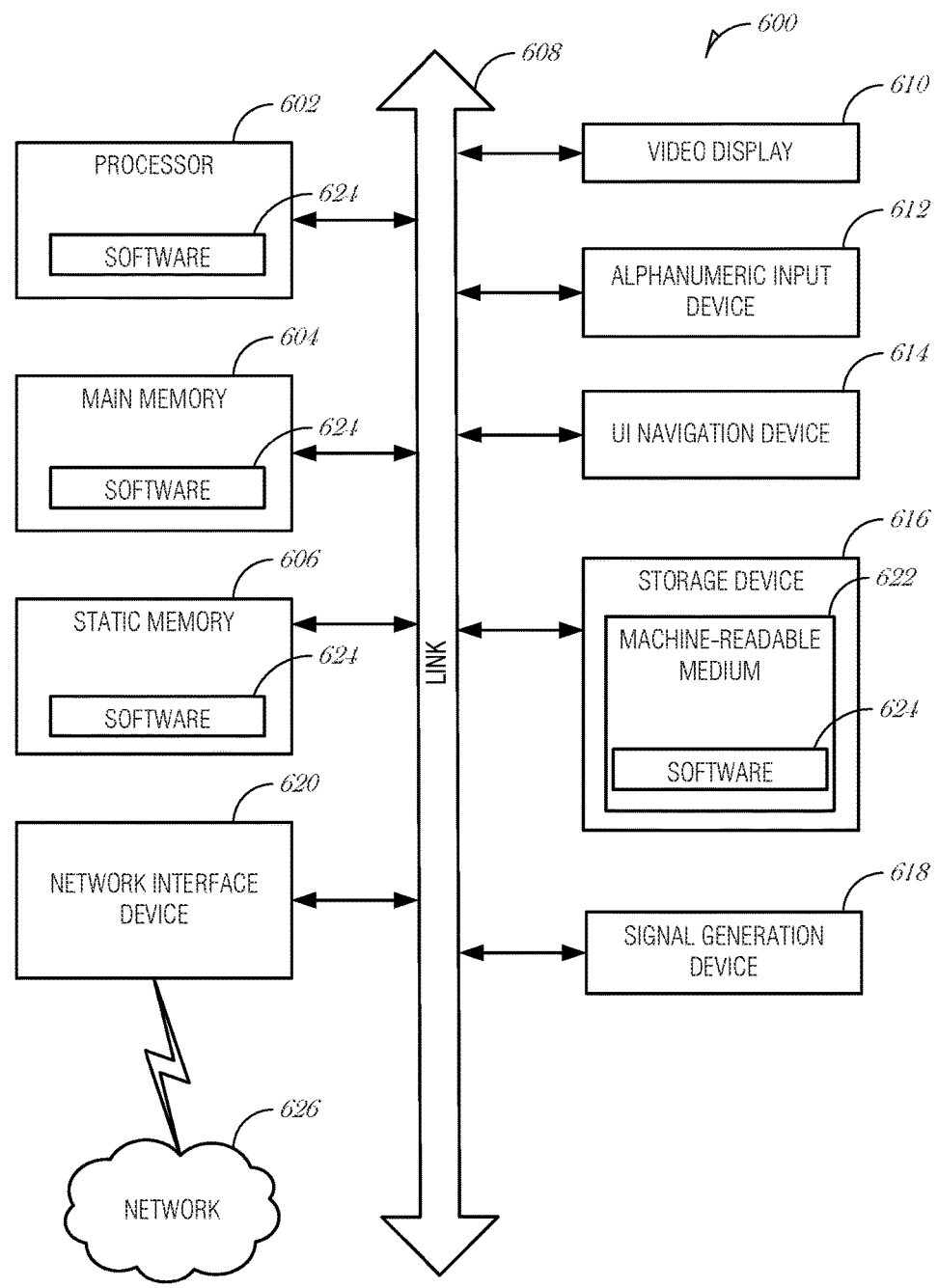
FIG. 6 is a block diagram illustrating an example machine upon which any one or more of the techniques (e.g., methodologies) discussed herein may perform, according to an example embodiment.

FIG. 6 is a block diagram illustrating a machine in the example form of a computer system 600, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 600 includes at least one processor 602 (e.g., a central processing unit (CPU), a graphics processing unit (GPU) or both, processor cores, compute nodes, etc.), a main memory 604 and a static memory 606, which communicate with each other via a link 608 (e.g., bus). The computer system 600 may further include a video display unit 610, an alphanumeric input device 612 (e.g., a keyboard), and a user interface (UI) navigation device 614 (e.g., a mouse). In one embodiment, the video display unit 610, input device 612 and UI navigation device 614 are incorporated into a touch screen display. The computer system 600 may additionally include a storage device 616 (e.g., a drive unit), a signal generation device 618 (e.g., a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g., a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 is a smart entry system, the system comprising: a detector to detect a person near a portal to a room; a transceiver to attempt to establish a wireless connection between the smart entry system and a user device associated with the person; and a user interface to present a notification to the person based on a state of the wireless connection.

In Example 2, the subject matter of Example 1 optionally includes wherein to detect the person near the portal, the detector is to: receive sensor data from a sensor coupled to the smart entry system; and detect the person with the sensor data.

In Example 3, the subject matter of Example 2 optionally includes wherein the sensor comprises a vibration sensor.

In Example 4, the subject matter of Example 3 optionally includes wherein to detect the person, the detector is to detect a pattern of footsteps with the vibration sensor indicating human gait.

In Example 5, the subject matter of any one or more of Examples 2-4 optionally include wherein the sensor comprises an infrared sensor.

In Example 6, the subject matter of any one or more of Examples 2-5 optionally include wherein the sensor comprises a camera.

In Example 7, the subject matter of Example 6 optionally includes wherein to detect the person, the detector is to perform at least one of a facial detection technique on an image acquired by the camera, a human detection technique on the image acquired by the camera, or a motion classification technique on a plurality of images acquired by the camera.

In Example 8, the subject matter of any one or more of Examples 2-7 optionally include wherein the sensor comprises a wireless beacon, the wireless beacon configured to sense the user device in proximity to the portal.

In Example 9, the subject matter of any one or more of Examples 2-8 optionally include wherein the sensor comprises a door sensor that activates when the door to the portal is opened.

In Example 10, the subject matter of any one or more of Examples 1-9 optionally include wherein the state of the wireless connection is unconnected and wherein to present the notification, the user interface is to present a visual alert to the person that the smart entry system was unable to connect to the user device.

In Example 11, the subject matter of any one or more of Examples 1-10 optionally include wherein the state of the wireless connection is unconnected and wherein to present the notification, the user interface is to present an audible alert to the person that the smart entry system was unable to connect to the user device.

In Example 12, the subject matter of any one or more of Examples 1-11 optionally include wherein when attempting to establish the wireless connection between the smart entry system and a user device associated with the person is successful, the user device is to perform an additional operation as a result of the wireless connection.

In Example 13, the subject matter of Example 12 optionally includes wherein the additional operation comprises: checking a battery level; and presenting an alert when the battery level is below a threshold.

In Example 14, the subject matter of Example 13 optionally includes wherein the threshold is based on an amount of power used in a day.

In Example 15, the subject matter of any one or more of Examples 13-14 optionally include wherein the threshold is based on an estimated amount of power needed for the remainder of a day.

In Example 16, the subject matter of any one or more of Examples 1-15 optionally include a user identifier to: attempt to identify the person; and access a profile database to obtain a set of devices associated with the person when the person is identified, wherein the user device is a device of the set of devices.

In Example 17, the subject matter of Example 16 optionally includes wherein to attempt to identify the person, the user identifier is to: access a pattern of vibrations; and identify the person based on the pattern of vibrations.

In Example 18, the subject matter of any one or more of Examples 16-17 optionally include wherein to attempt to identify the person, the user identifier is to: access an image of the person; and perform image analysis to identify the person.

In Example 19, the subject matter of Example 18 optionally includes wherein the image analysis includes a gait analysis of the person's stride.

In Example 20, the subject matter of any one or more of Examples 18-19 optionally include wherein the image analysis includes facial analysis of the person's face.

In Example 21, the subject matter of any one or more of Examples 18-20 optionally include wherein the image analysis includes morphological analysis of the person's body.

In Example 22, the subject matter of any one or more of Examples 16-21 optionally include wherein to attempt to identify the person, the user identifier is to: access a voice sample of the person; and perform voice analysis to identify the person.

In Example 23, the subject matter of any one or more of Examples 16-22 optionally include wherein the profile database includes a plurality of profiles.

In Example 24, the subject matter of any one or more of Examples 16-23 optionally include wherein the room is a room in a residence, and wherein the profile database includes a plurality of profiles for a subset of people who reside in the residence.

In Example 25, the subject matter of any one or more of Examples 16-24 optionally include wherein when attempting to identify the person fails, the user interface is to prompt the person to perform an initialization process to train the smart entry system on the person.

Example 26 is a method of providing a smart entry system, the method comprising: detecting, at a smart entry system, a person near a portal to a room; attempting to establish a wireless connection between the smart entry system and a user device associated with the person; and presenting, by the smart entry system, a notification to the person based on a state of the wireless connection.

In Example 27, the subject matter of Example 26 optionally includes wherein detecting the person near the portal comprises: receiving sensor data from a sensor coupled to the smart entry system; and detecting the person with the sensor data.

In Example 28, the subject matter of Example 27 optionally includes wherein the sensor comprises a vibration sensor.

In Example 29, the subject matter of Example 28 optionally includes wherein detecting the person comprises detecting a pattern of footsteps with the vibration sensor indicating human gait.

In Example 30, the subject matter of any one or more of Examples 27-29 optionally include wherein the sensor comprises an infrared sensor.

In Example 31, the subject matter of any one or more of Examples 27-30 optionally include wherein the sensor comprises a camera.

In Example 32, the subject matter of Example 31 optionally includes wherein detecting the person comprises performing at least one of a facial detection technique on an image acquired by the camera, a human detection technique on the image acquired by the camera, or a motion classification technique on a plurality of images acquired by the camera.

In Example 33, the subject matter of any one or more of Examples 27-32 optionally include wherein the sensor comprises a wireless beacon, the wireless beacon configured to sense the user device in proximity to the portal.

In Example 34, the subject matter of any one or more of Examples 27-33 optionally include wherein the sensor comprises a door sensor that activates when the door to the portal is opened.

In Example 35, the subject matter of any one or more of Examples 26-34 optionally include wherein the state of the wireless connection is unconnected and wherein presenting the notification comprises presenting a visual alert to the person that the smart entry system was unable to connect to the user device.

In Example 36, the subject matter of any one or more of Examples 26-35 optionally include wherein the state of the wireless connection is unconnected and wherein presenting the notification comprises presenting an audible alert to the person that the smart entry system was unable to connect to the user device.

In Example 37, the subject matter of any one or more of Examples 26-36 optionally include wherein when attempting to establish the wireless connection between the smart entry system and a user device associated with the person is successful, the user device performs an additional operation as a result of the wireless connection.

In Example 38, the subject matter of Example 37 optionally includes wherein the additional operation comprises: checking a battery level; and presenting an alert when the battery level is below a threshold.

In Example 39, the subject matter of Example 38 optionally includes wherein the threshold is based on an amount of power used in a day.

In Example 40, the subject matter of any one or more of Examples 38-39 optionally include wherein the threshold is based on an estimated amount of power needed for the remainder of a day.

In Example 41, the subject matter of any one or more of Examples 26-40 optionally include attempting to identify the person; and accessing a profile database to obtain a set of devices associated with the person when the person is identified, wherein the user device is a device of the set of devices.

In Example 42, the subject matter of Example 41 optionally includes wherein attempting to identify the person comprises: accessing a pattern of vibrations; and identifying the person based on the pattern of vibrations.

In Example 43, the subject matter of any one or more of Examples 41-42 optionally include wherein attempting to identify the person comprises: accessing an image of the person; and performing image analysis to identify the person.

In Example 44, the subject matter of Example 43 optionally includes wherein the image analysis includes a gait analysis of the person's stride.

In Example 45, the subject matter of any one or more of Examples 43-44 optionally include wherein the image analysis includes facial analysis of the person's face.

In Example 46, the subject matter of any one or more of Examples 43-45 optionally include wherein the image analysis includes morphological analysis of the person's body.

In Example 47, the subject matter of any one or more of Examples 41-46 optionally include wherein attempting to identify the person comprises: accessing a voice sample of the person; and performing voice analysis to identify the person.

In Example 48, the subject matter of any one or more of Examples 41-47 optionally include wherein the profile database includes a plurality of profiles.

In Example 49, the subject matter of any one or more of Examples 41-48 optionally include wherein the room is a room in a residence, and wherein the profile database includes a plurality of profiles for a subset of people who reside in the residence.

In Example 50, the subject matter of any one or more of Examples 41-49 optionally include wherein when attempting to identify the person fails, the method further comprises prompting the person to perform an initialization process to train the smart entry system on the person.

Example 51 is at least one machine-readable medium including instructions, which when executed by a machine, cause the machine to perform operations of any of the methods of Examples 26-50.

Example 52 is an apparatus comprising means for performing any of the methods of Examples 26-50.

Example 53 is at least one machine-readable medium including instructions for providing a smart entry system, which when executed by a machine, cause the machine to: detect, at a smart entry system, a person near a portal to a room; attempt to establish a wireless connection between the smart entry system and a user device associated with the person; and present, by the smart entry system, a notification to the person based on a state of the wireless connection.

In Example 54, the subject matter of Example 53 optionally includes wherein the instructions to detect the person near the portal, comprise instructions to: receive sensor data from a sensor coupled to the smart entry system; and detect the person with the sensor data.

In Example 55, the subject matter of Example 54 optionally includes wherein the sensor comprises a vibration sensor.

In Example 56, the subject matter of Example 55 optionally includes wherein the instructions to detect the person comprise instructions to detect a pattern of footsteps with the vibration sensor indicating human gait.

In Example 57, the subject matter of any one or more of Examples 54-56 optionally include wherein the sensor comprises an infrared sensor.

In Example 58, the subject matter of any one or more of Examples 54-57 optionally include wherein the sensor comprises a camera.

In Example 59, the subject matter of Example 58 optionally includes wherein the instructions to detect the person comprise instructions to perform at least one of a facial detection technique on an image acquired by the camera, a human detection technique on the image acquired by the camera, or a motion classification technique on a plurality of images acquired by the camera.

In Example 60, the subject matter of any one or more of Examples 54-59 optionally include wherein the sensor comprises a wireless beacon, the wireless beacon configured to sense the user device in proximity to the portal.

In Example 61, the subject matter of any one or more of Examples 54-60 optionally include wherein the sensor comprises a door sensor that activates when the door to the portal is opened.

In Example 62, the subject matter of any one or more of Examples 53-61 optionally include wherein the state of the wireless connection is unconnected and wherein the instructions to present the notification comprise instructions to present a visual alert to the person that the smart entry system was unable to connect to the user device.

In Example 63, the subject matter of any one or more of Examples 53-62 optionally include wherein the state of the wireless connection is unconnected and wherein the instructions to present the notification comprise instructions to present an audible alert to the person that the smart entry system was unable to connect to the user device.

In Example 64, the subject matter of any one or more of Examples 53-63 optionally include wherein when attempting to establish the wireless connection between the smart entry system and a user device associated with the person is successful, the user device performs an additional operation as a result of the wireless connection.

In Example 65, the subject matter of Example 64 optionally includes wherein the additional operation comprises: checking a battery level; and presenting an alert when the battery level is below a threshold.

In Example 66, the subject matter of Example 65 optionally includes wherein the threshold is based on an amount of power used in a day.

In Example 67, the subject matter of any one or more of Examples 65-66 optionally include wherein the threshold is based on an estimated amount of power needed for the remainder of a day.

In Example 68, the subject matter of any one or more of Examples 53-67 optionally include instructions to: attempt to identify the person; and access a profile database to obtain a set of devices associated with the person when the person is identified, wherein the user device is a device of the set of devices.

In Example 69, the subject matter of Example 68 optionally includes wherein the instructions to attempt to identify the person comprise instructions to: access a pattern of vibrations; and identify the person based on the pattern of vibrations.

In Example 70, the subject matter of any one or more of Examples 68-69 optionally include wherein the instructions to attempt to identify the person comprise the instructions to: access an image of the person; and perform image analysis to identify the person.

In Example 71, the subject matter of Example 70 optionally includes wherein the image analysis includes a gait analysis of the person's stride.

In Example 72, the subject matter of any one or more of Examples 70-71 optionally include wherein the image analysis includes facial analysis of the person's face.

In Example 73, the subject matter of any one or more of Examples 70-72 optionally include wherein the image analysis includes morphological analysis of the person's body.

In Example 74, the subject matter of any one or more of Examples 68-73 optionally include wherein the instructions to attempt to identify the person comprise instructions to: access a voice sample of the person; and perform voice analysis to identify the person.

In Example 75, the subject matter of any one or more of Examples 68-74 optionally include wherein the profile database includes a plurality of profiles.

In Example 76, the subject matter of any one or more of Examples 68-75 optionally include wherein the room is a room in a residence, and wherein the profile database includes a plurality of profiles for a subset of people who reside in the residence.

In Example 77, the subject matter of any one or more of Examples 68-76 optionally include wherein when attempting to identify the person fails, the instructions further comprise instructions to prompt the person to perform an initialization process to train the smart entry system on the person.

Example 78 is an apparatus for providing a smart entry system, the apparatus comprising: means for detecting, at a smart entry system, a person near a portal to a room; means for attempting to establish a wireless connection between the smart entry system and a user device associated with the person; and means for presenting, by the smart entry system, a notification to the person based on a state of the wireless connection.

In Example 79, the subject matter of Example 78 optionally includes wherein the means for detecting the person near the portal comprises: means for receiving sensor data from a sensor coupled to the smart entry system; and means for detecting the person with the sensor data.

In Example 80, the subject matter of Example 79 optionally includes wherein the sensor comprises a vibration sensor.

In Example 81, the subject matter of Example 80 optionally includes wherein the means for detecting the person comprises means for detecting a pattern of footsteps with the vibration sensor indicating human gait.

In Example 82, the subject matter of any one or more of Examples 79-81 optionally include wherein the sensor comprises an infrared sensor.

In Example 83, the subject matter of any one or more of Examples 79-82 optionally include wherein the sensor comprises a camera.

In Example 84, the subject matter of Example 83 optionally includes wherein the means for detecting the person comprises means for performing at least one of a facial detection technique on an image acquired by the camera, a human detection technique on the image acquired by the camera, or a motion classification technique on a plurality of images acquired by the camera.

In Example 85, the subject matter of any one or more of Examples 79-84 optionally include wherein the sensor comprises a wireless beacon, the wireless beacon configured to sense the user device in proximity to the portal.

In Example 86, the subject matter of any one or more of Examples 79-85 optionally include wherein the sensor comprises a door sensor that activates when the door to the portal is opened.

In Example 87, the subject matter of any one or more of Examples 78-86 optionally include wherein the state of the wireless connection is unconnected and wherein the means for presenting the notification comprises means for presenting a visual alert to the person that the smart entry system was unable to connect to the user device.

In Example 88, the subject matter of any one or more of Examples 78-87 optionally include wherein the state of the wireless connection is unconnected and wherein the means for presenting the notification comprises means for presenting an audible alert to the person that the smart entry system was unable to connect to the user device.

In Example 89, the subject matter of any one or more of Examples 78-88 optionally include wherein when attempting to establish the wireless connection between the smart entry system and a user device associated with the person is successful, the user device performs an additional operation as a result of the wireless connection.

In Example 90, the subject matter of Example 89 optionally includes wherein the additional operation comprises: checking a battery level; and presenting an alert when the battery level is below a threshold.

In Example 91, the subject matter of Example 90 optionally includes wherein the threshold is based on an amount of power used in a day.

In Example 92, the subject matter of any one or more of Examples 90-91 optionally include wherein the threshold is based on an estimated amount of power needed for the remainder of a day.

In Example 93, the subject matter of any one or more of Examples 78-92 optionally include means for attempting to identify the person; and means for accessing a profile database to obtain a set of devices associated with the person when the person is identified, wherein the user device is a device of the set of devices.

In Example 94, the subject matter of Example 93 optionally includes wherein the means for attempting to identify the person comprises: means for accessing a pattern of vibrations; and means for identifying the person based on the pattern of vibrations.

In Example 95, the subject matter of any one or more of Examples 93-94 optionally include wherein the means for attempting to identify the person comprises: means for accessing an image of the person; and means for performing image analysis to identify the person.

In Example 96, the subject matter of Example 95 optionally includes wherein the image analysis includes a gait analysis of the person's stride.

In Example 97, the subject matter of any one or more of Examples 95-96 optionally include wherein the image analysis includes facial analysis of the person's face.

In Example 98, the subject matter of any one or more of Examples 95-97 optionally include wherein the image analysis includes morphological analysis of the person's body.

In Example 99, the subject matter of any one or more of Examples 93-98 optionally include wherein the means for attempting to identify the person comprises: means for accessing a voice sample of the person; and means for performing voice analysis to identify the person.

In Example 100, the subject matter of any one or more of Examples 93-99 optionally include wherein the profile database includes a plurality of profiles.

In Example 101, the subject matter of any one or more of Examples 93-100 optionally include wherein the room is a room in a residence, and wherein the profile database includes a plurality of profiles for a subset of people who reside in the residence.

In Example 102, the subject matter of any one or more of Examples 93-101 optionally include wherein when attempting to identify the person fails, the apparatus further comprises means for prompting the person to perform an initialization process to train the smart entry system on the person.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A smart entry system, the system comprising:
   a detector to detect a person near a portal to a room;
   a door sensor that activates in response to the door to the portal being opened;
   a transceiver to attempt to establish a wireless connection between the smart entry system and a user device associated with the person, in response to detecting that the door to the portal is opened; and
   a user interface to present a notification to the person based on a state of the wireless connection.

2. The system of claim 1, wherein to detect the person near the portal, the detector is to:
   receive sensor data from a sensor coupled to the smart entry system; and
   detect the person with the sensor data.

3. The system of claim 2, wherein the sensor comprises a vibration sensor.

4. The system of claim 3, wherein to detect the person, the detector is to detect a pattern of footsteps with the vibration sensor indicating human gait.

5. The system of claim 2, wherein the sensor comprises a wireless beacon, the wireless beacon configured to sense the user device in proximity to the portal.

6. The system of claim 1, wherein the state of the wireless connection is unconnected and wherein to present the notification, the user interface is to present a visual alert to the person that the smart entry system was unable to connect to the user device.

7. The system of claim 1, wherein the state of the wireless connection is unconnected and wherein to present the notification, the user interface is to present an audible alert to the person that the smart entry system was unable to connect to the user device.

8. The system of claim 1, wherein when attempting to establish the wireless connection between the smart entry system and a user device associated with the person is successful, the user device is to perform an additional operation as a result of the wireless connection.

9. The system of claim 8, wherein the additional operation comprises:
   checking a battery level; and
   presenting an alert when the battery level is below a threshold.

10. The system of claim 9, wherein the threshold is based on an amount of power used in a day.

11. The system of claim 9, wherein the threshold is based on an estimated amount of power needed for the remainder of a day.

12. The system of claim 1, further comprising a user identifier to:
   attempt to identify the person; and
   access a profile database to obtain a set of devices associated with the person when the person is identified,
   wherein the user device is a device of the set of devices.

13. The system of claim 12, wherein to attempt to identify the person, the user identifier is to:
   access a pattern of vibrations; and
   identify the person based on the pattern of vibrations.

14. The system of claim 12, wherein the profile database includes a plurality of profiles.

15. The system of claim 12, wherein the room is a room in a residence, and wherein the profile database includes a plurality of profiles for a subset of people who reside in the residence.

16. The system of claim 12, wherein when attempting to identify the person fails, the user interface is to prompt the person to perform an initialization process to train the smart entry system on the person.

17. A method of providing a smart entry system, the method comprising:
   detecting, at a smart entry system, a person near a portal to a room;
   detecting, at the smart entry system, that a door to the portal has been opened;
   attempting to establish a wireless connection between the smart entry system and a user device associated with the person, in response to detecting that the door to the portal was opened; and
   presenting, by the smart entry system, a notification to the person based on a state of the wireless connection.

18. The method of claim 17, wherein detecting the person near the portal comprises:
   receiving sensor data from a sensor coupled to the smart entry system; and
   detecting the person with the sensor data.

19. The method of claim 18, wherein the sensor comprises a door sensor that activates when the door to the portal is opened.

20. The method of claim 17, wherein the state of the wireless connection is unconnected and wherein presenting the notification comprises presenting a visual alert to the person that the smart entry system was unable to connect to the user device.

21. At least one non-transitory machine-readable medium including instructions for providing a smart entry system, which when executed by a machine, cause the machine to:
   detect, at a smart entry system, a person near a portal to a room;
   detect, at the smart entry system, that a door to the portal has been opened;
   attempt to establish a wireless connection between the smart entry system and a user device associated with the person, in response to detecting that the door to the portal was opened; and
   present, by the smart entry system, a notification to the person based on a state of the wireless connection.

22. The at least one non-transitory machine-readable medium of claim 21, wherein the state of the wireless connection is unconnected and wherein the instructions to present the notification comprise instructions to present a visual alert to the person that the smart entry system was unable to connect to the user device.

23. The at least one non-transitory machine-readable medium of claim 21, wherein when attempting to establish the wireless connection between the smart entry system and a user device associated with the person is successful, the user device performs an additional operation as a result of the wireless connection.

24. The at least one non-transitory machine-readable medium of claim 23, wherein the additional operation comprises:
   checking a battery level; and presenting an alert when the battery level is below a threshold.

* * * * *